Dec. 8, 1931.  J. T. WRIGHT  1,835,551
DRILL HEAD
Filed April 29, 1930    2 Sheets-Sheet 1
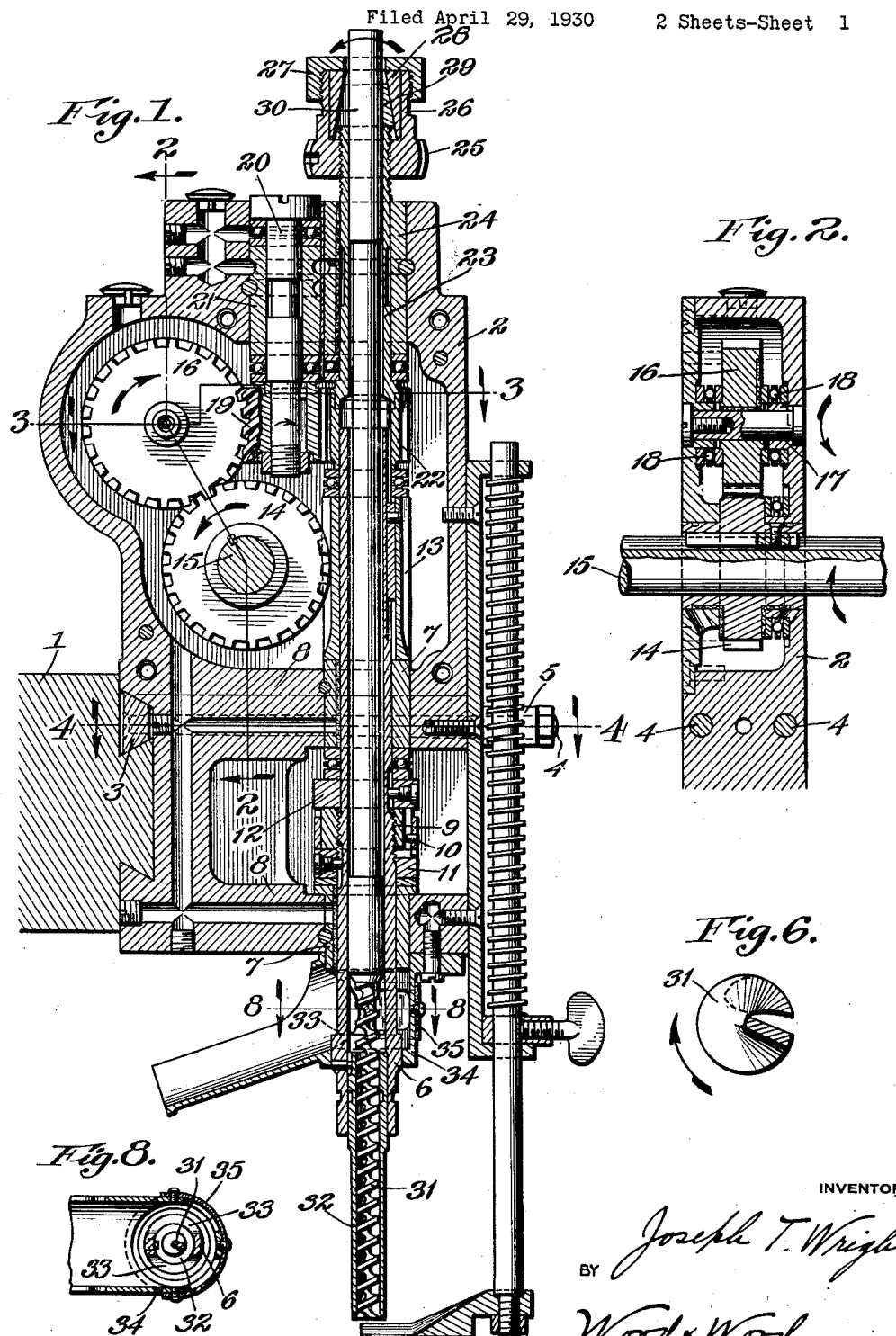
INVENTOR
Joseph T. Wright
BY
Wood & Wood ATTORNEYS

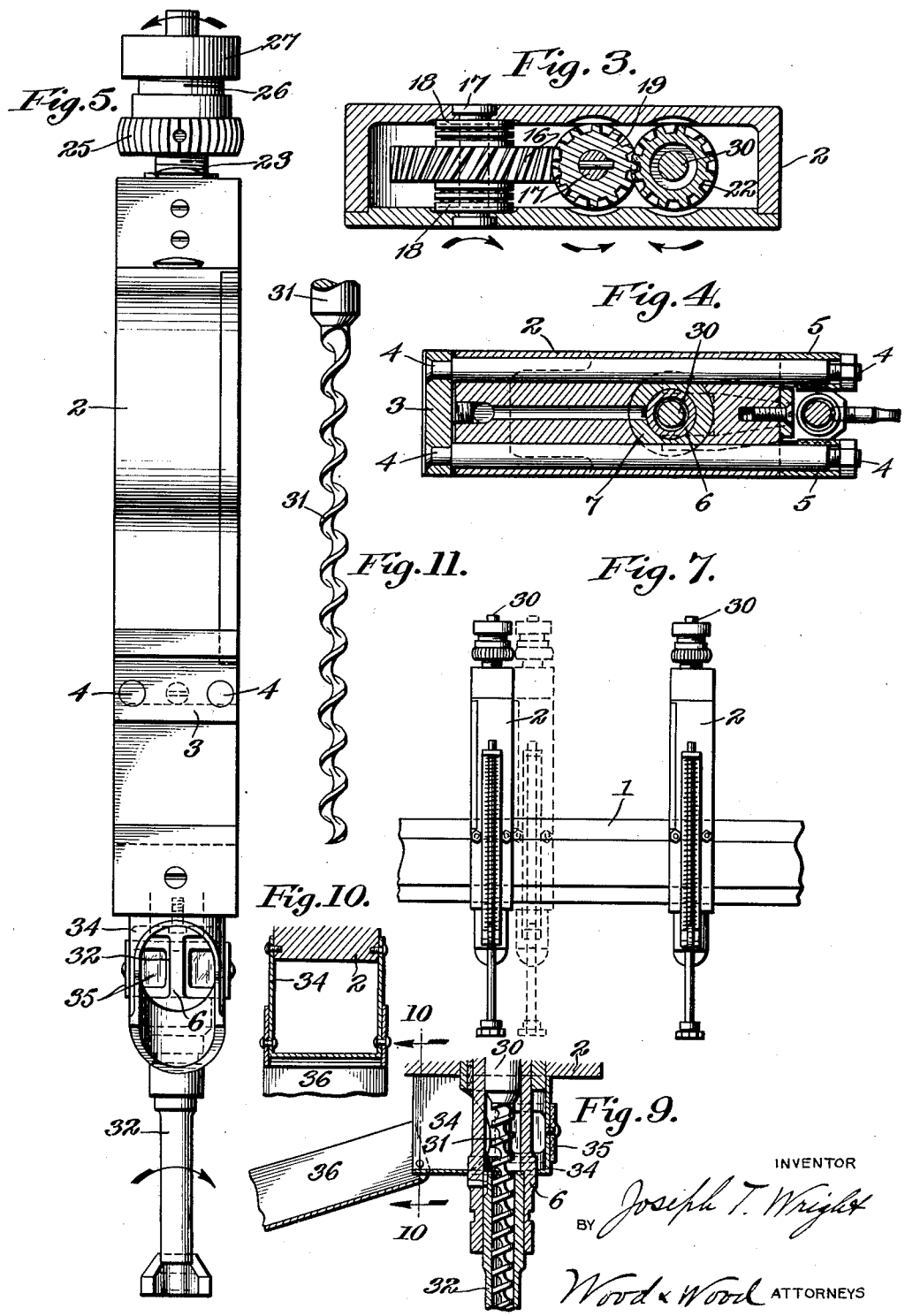

Patented Dec. 8, 1931

1,835,551

UNITED STATES PATENT OFFICE

JOSEPH T. WRIGHT, OF CINCINNATI, OHIO, ASSIGNOR, BY MESNE ASSIGNMENTS, TO THE HARRIS-SEYBOLD-POTTER COMPANY, OF CLEVELAND, OHIO, A CORPORATION OF DELAWARE

DRILL HEAD

Application filed April 29, 1930. Serial No. 448,385.

The invention relates to improvements in drilling machines and particularly to the structure of the head carrying the drill spindle.

An object of the invention is to provide a drill head in which the parts are more compactly arranged to reduce the width of the head and distance of drill spacing when a plurality of heads are mounted in a row side by side.

Another object of the invention is to provide a drill head for rotatively mounting a hollow or tubular drill, primarily employed for drilling paper, with an extractor within the bore of the drill, rotating in an opposite or reverse direction from the spindle carrying the drill and arranged to be vertically upwardly, withdrawn from the spindle and head and to provide coupling devices for connecting the transmission gearing setting up the drill and extractor.

Another object of the invention is to relatively conversely rotate a drill spindle and an extractor bit concentrically extended within the spindle by transmission gearing constituting helical gears arranged in a common vertical plane adapting the same to be housed within an extremely narrow width of head or casing.

Another object of the invention relates to providing an extractor bit for carrying off or elevating the cuttings through the bore of a hollow drill or tubular cutter of a structure to increase its efficiency and prevent the cuttings from clogging about the bit within the bore of the drill.

Other features and advantages of the invention will be more fully set forth in the description of the accompanying drawings, in which:

Figure 1 is a central vertical section through the improved drill head.

Fig. 2 is a section on line 2—2, Fig. 1.
Fig. 3 is a section on line 3—3, Fig. 1.
Fig. 4 is a section on line 4—4, Fig 1.
Fig. 5 is a rear elevation of the head.
Fig. 6 is an enlarged cross section through the spiral extractor taken at the point end of the bit.

Fig. 7 is a detailed front elevation of a plurality of heads mounted upon a stationary cross rail of a drilling machine.

Fig. 8 is a section of line 8—8, Fig. 1.
Fig. 9 is a detailed sectional view of the lower portion of the spindle, showing a modified form of discharge chute for conveying the cuttings or chips discharged from the spindle rearwardly.

Fig. 10 is a section of line 10—10, Fig. 9.
Fig. 11 is an elevation of the extractor.

The head primarily is adapted by carrying a hollow or tubular rotating drill, and a spiral rotating extractor imposed concentrically within the bore of the drill, for use in drilling through a pack thickness of paper. The drilling machine provides for a plurality of heads relatively adjusted upon a common support and a single horizontal drive shaft for rotating all of the spindles. In the multiple capacity there is occasion for having the center spacing of the drill spindles of a dimension to bring the drills as close together as possible. This necessitates bringing the heads abuttingly side by side, and the operating parts very compactly organized within the head to reduce the width of the head to a minimum, the width of the head governing the minimum spacing of the spindles without off-setting.

Referring to the drawings which indicate a section of a stationary, cross or horizontal rail of a drilling machine upon which one or several heads are mounted, having forward dovetailed face upon which the heads are supported and clamped.

The head comprises the hollow casing 2 having plane opposite sides for hinging a plurality of heads together side by side and at its lower rear side provided with a dovetailed groove for engaging with the dovetail formed on the forward face of the rail 1. The parts are clamped together by a gib plate 3, carried by a pair of parallel tie bolts extended laterally or horizontally through the casing at relatively opposite sides of the drill spindle. The rear ends of the bolts 4 are rigidly fixed to the plate, and the forward ends each are threaded to receive a nut engaging the collar 5 concentrically engaged about the bolt between the nut and forward face of the casing. Threading the nut against the collar draws the rod forward, bringing the gib into engagement with the opposite inclined surfaces of the head and rail, clamping the heads rigidly together.

A vertical spindle 6 is journalled within a pair of bearing bushings 7—7, fixed within bearing position 8—8, of the casing. The spindle intermediately is provided with a threaded portion engaged by a nut 9, normally locked against independent rotation by a slidable lock collar 10, concentric about the nut, and has a toothed engagement with a bearing collar 11, keyed to the spindle and bearing against the lower side of the nut. A second bearing collar 12 fixed or keyed to the spindle, bears against the opposite or upper end of the nut and the bearing collars and nut as a unit are confined against axial movement by the spindle bearings of the casing. The nut provides means for micrometrically vertically adjusting the spindle within the casing, and the structure disclosed is substantially the same as that disclosed in a prior patent issued to me, No. 1,554,060 dated September 15, 1925.

A helical gear 13, splined upon the upper end of the spindle is in mesh with a helical gear 14 journalled within bearings of the casing and splined upon the driving shaft 15 which is suitably journalled at its opposite ends in the frame of the drilling machine and extends parallel with the cross rail. The shaft 15 provides a common power medium for all of the heads mounted upon the cross rail. The shaft 15, therefore, extends through the casing and the gear 14 is provided with opposite hub extensions, bearing within the casing as illustrated in Fig. 2.

The gear 14 is in mesh with a helical gear 16 journalled upon a stud 17, fixed within the casing 2 and the gear 16 laterally bears against ball thrust bearings 18—18, disposed at opposite sides of the gear. The gear 16 is in mesh with an intermediate helical gear 19, for transmission direction reversing, which is dependently fixed to the lower end of a vertical stud shaft 20 extending through, and journalled in a bushing 21, non-rotatively mounted in the casing 3.

A ball thrust bearing is interposed between the head of the stud shaft 20 and the upper end of the bushing 21, and also between the opposite or lower end of the bushing and gear 19. The gear 19 is in mesh with a helical gear 22, telescopically loosely engaged over the upper end of the spindle 7, and bears against a thrust ball bearing interposed between said gear and gear 14.

All of the gears are in vertical plane in line with the axis of the spindle, and in train connection, transmitted by the shaft 15. It is also comprehended that a second shaft parallel with the horizontal shaft 15, rotating reversely, may be employed for transmitting the gear 22, driving the extractor. The present form, however, permits the improved head to be incorporated with the machines in commercial use having a single horizontal driving shaft.

The gear 22 is provided with an extended hub 23, journalled within a bushing 24, non-rotatively mounted in the casing 3 and a ball thrust bearing is interposed between the lower end of the bushing and the upper side of the gear 22. The hub 23 of the gear extends beyond the upper end of the casing and its projected end is exteriorly threaded to receive a nut 25. The nut 25 has a hub or sleeve extension 26 exteriorly threaded to receive a gland nut 27 capping the hub extension 26, for enclosing and compressing an internally tapered clamp collar 28 concentrically engaged within the bore of the nut 25. The clamp collar compressively engages an externally tapered or conical collet 29, for frictionally coupling the gear 22 to the shank 30, of the spiral extractor 31, concentrically engaged through the spindle and within a tubular drill or cutter 32, removably fixed to the lower end of the spindle.

The collet mechanism aside from frictionally coupling the extractor to the transmission for rotating the extractor, provides means for vertically adjusting the extractor within the spindle, it being preferable that the tip of the extractor be set flush with the cutting edge of the drill. In setting up a drill or interchanging one drill for another it is advisable to completely remove or withdraw the extractor and not reinsert it until the drill has been properly adjusted by the drill spindle adjusting mechanism or nut 10. After the drill adjustments have been made, the extractor is inserted in place and vertically adjusted to bring its tip flush with the cutting edge of the drill, whereupon the gland nut 27 is tightened frictionally, coupling the extractor to the gear 22. With the shank of the extractor extending vertically completely through the drill head it is at all times conveniently accessible for making its relative adjustment with the cutting edge of the drill, or for removing the extractor and obviates the necessity of unduly lowering or shifting the work supporting table of the machine. It also makes it more convenient to vertically adjust the extractor relatively to the drill.

The parts within the head are compactly assembled, and with the particular type of gearing employed permit the width of the head to be materially reduced, the width governed primarily by the diameter of the spindle structure and size of transmission gearing axially thereon. The transmission provides for rotating the spindle in one direction, say to the left, while the extractor is operated in the reverse direction, say to the right, and as illustrated, both are run at the same rate of speed although it be recognized that they could be run at differential speeds. The relative rates of speeds is primarily governed by the size of drill employed as for large sizes of drill it would be more desirable to have the extractor rotate at a higher rate than the drill.

All of the gears under the present arrangement preferably are housed within a single lubricant holding compartment or chamber adapting all of the gears to constantly run in a lubricant with which the chamber is filled and the lubricant system provides delivering the lubricant to the bearings of the spindle below the transmission gear with the lubricants supplied from said gear chamber. The structure is very sturdy, noiseless in operation, is designed for operation at high speeds giving increased efficiency.

The lower end of the spindle slightly above the drill receiving socket is provided with openings 33 for laterally discharging the cuttings as elevated through the drill by the extractor, and discharged into a spout extending from the discharge chamber. The discharge chamber surrounds the spindle and is formed by a shell 34, fixed to the under side of the head, and the shell is circumferentially provided with window openings covered by a transparent strip 35. This gives a sight opening for the operator, from which he can determine whether the extractor is of proper height for the length of drill employed, and to see whether the cuttings are being properly discharged. The helical portion of the spiral should terminate within the discharge chamber and in line with the openings through the spindle, so as to leave no opportunity for massing the cuttings above the openings. The structure of the extractor is of such, as to readily dislodge the cuttings and eject them as rapidly as elevated through the spiral way formed by the convolutions of the extractor and bore of the drill.

In the modification shown in Figs. 9 and 10, the shell 34 forming the discharge chamber about the upper end of the drill is provided with a trough 36 hingedly mounted upon the shell and preferably directed rearwardly. The free end of the trough extends beyond the rear edge of the work supporting table or beyond the rear edge of the work supported upon the table adapting it to be contacted thereby to swing the trough with the elevating motion of the table.

It has been experienced that the structure of helix of the extractor is very important to avoid clogging and heating of the drill. It is therefore preferable to have a very coarse lead of thread measuring in excess of the diameter of the helix, and a very small width of flat at the top of the thread. The coarse lead allows considerable freedom for the cuttings and the small width of flat reduces the area of the bearing surface against the bore of the drill, materially reducing friction between the surfaces and thereby eliminates undue heating of the parts. Such design of helix, when run at a high velocity, rapidly elevates the cuttings which move upwardly under a whirling motion without resistance, relieving the teeth or convolutions of any compression or undue torsional strain, or duty the purpose being to have the extractor in tension axially instead of compression as it would be if it were to function as an auger. The larger the area of helical way, which may be termed chip clearance, the lesser the possibility of clogging, and with the cuttings moving rapidly upward in a separated condition the lesser the opportunity to wad.

Having described my invention, I claim

1. A drill head capable for adjustable mounting upon a stationary cross-rail of a drilling machine, comprising, a casing, a rotative tubular spindle vertically journalled in said casing, a rotative extractor having a shank concentrically engaged through said spindle, a pair of gears coaxial with said spindle and extractor shank, one rotatively connecting with the spindle and the second with the extractor shank, a train of gears connecting said pair of gears one thereof constituting a driver, and all of the gears housed by the casing within a single compartment thereof.

2. A drill head drilling machine, comprising a casing, a rotative tubular spindle vertically journalled in said casing, a rotative extractor having a shank concentrically engaged through said spindle and removable therefrom, a pair of gears coaxial with said spindle and extractor shank, one rotatively connecting with the spindle and the second with the extractor shank, and a train of gears connecting said pair of gears one thereof constituting a driver, and means for coupling said second gear to said extractor shank.

3. A drill head drilling machine, comprising a casing, a rotative tubular spindle vertically journalled in said casing, a rotative extractor having a shank concentrically engaged through said spindle and removable therefrom, a pair of gears coaxial with said spindle and extractor shank, one rotatively connecting with the spindle and the second with the extractor shank, and means for coupling said second gear to said extractor shank.

4. A drill head, comprising, a casing, a rotative tubular spindle vertically journalled in said casing, a rotative extractor having a shank concentrically engaged through said spindle and removable therefrom, a pair of gears coaxial with said spindle and extractor shank, one rotatively connecting with the spindle and the second with the extractor shank, means for rotating said gears in relative reverse directions, and means for coupling said shank to said second gear and vertically adjusting the shank within the spindle.

5. A drill head, comprising, a casing, a rotative tubular spindle vertically journalled in said casing, means for vertically adjusting the spindle, a rotative extractor having a shank concentrically engaged through said spindle, a pair of gears coaxial with said spindle and extractor shank, one rotatively connecting with the spindle and the second with the extractor shank gearing for relatively reversely rotating said gears, means for removably supporting said extractor shank within the spindle and coupling the shank to said second gear.

6. A drill head for drilling machines, comprising, a casing, a rotating tubular spindle vertically journalled in said casing, a rotating extractor having a shank concentrically engaged through said spindle, a gear fixed to the spindle, a second gear co-axial with said spindle, journalled in said casing and adapted to be fixed to said extractor, and a train of gears connecting said gears for the spindle and extractor shank, one thereof constituting a driver and journalled in and enclosed by said casing.

7. A drill head for drilling machines, comprising, a casing, a rotating tubular spindle vertically journalled in said casing, a rotating extractor having a shank concentrically engaged through said spindle, a helical gear splined on the spindle, a second helical gear co-axial with said spindle, journalled in said casing and adapted to be fixed to said extractor, a cross shaft engaged through the casing, helical gears connecting said gears with the spindle and extractor shank, one thereof splined on said cross shaft and directly engaged with said helical gear on said spindle.

In witness whereof, I hereunto subscribe my name.

JOSEPH T. WRIGHT.